June 12, 1956 — O. P. BURCH — 2,750,058
BOAT TRAILER
Filed May 20, 1954 — 2 Sheets-Sheet 1
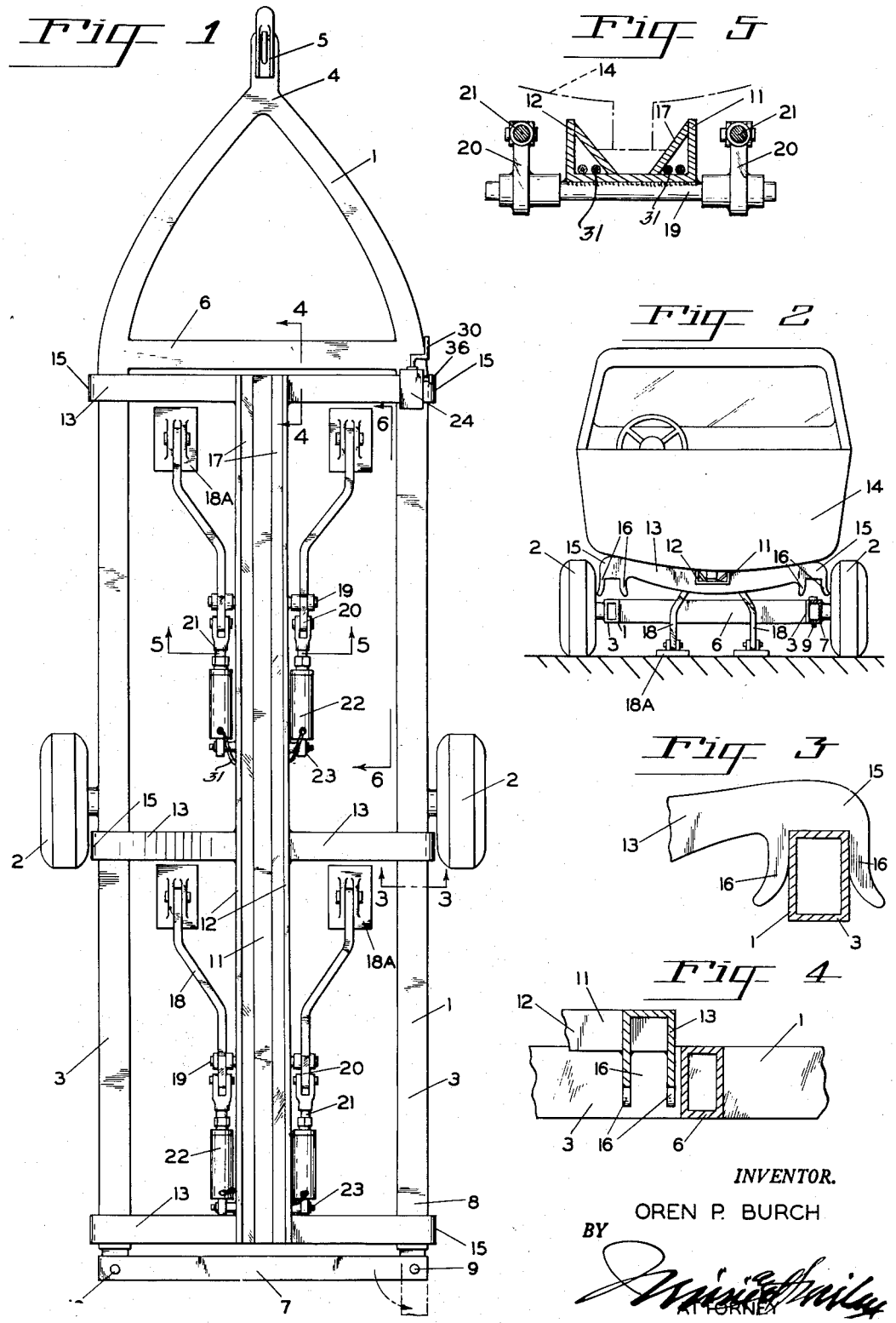
INVENTOR.
OREN P. BURCH June 12, 1956     O. P. BURCH     2,750,058
BOAT TRAILER
Filed May 20, 1954                             2 Sheets-Sheet 2
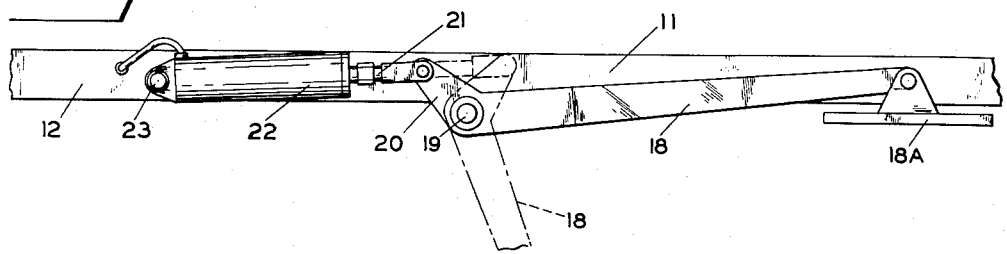
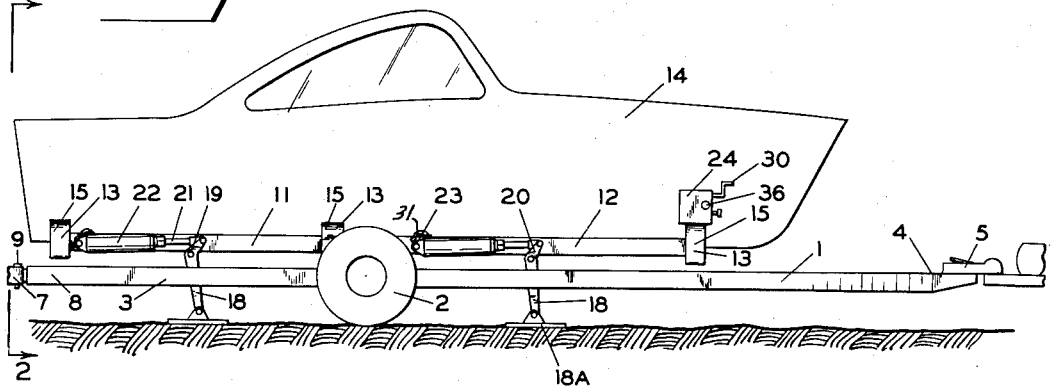
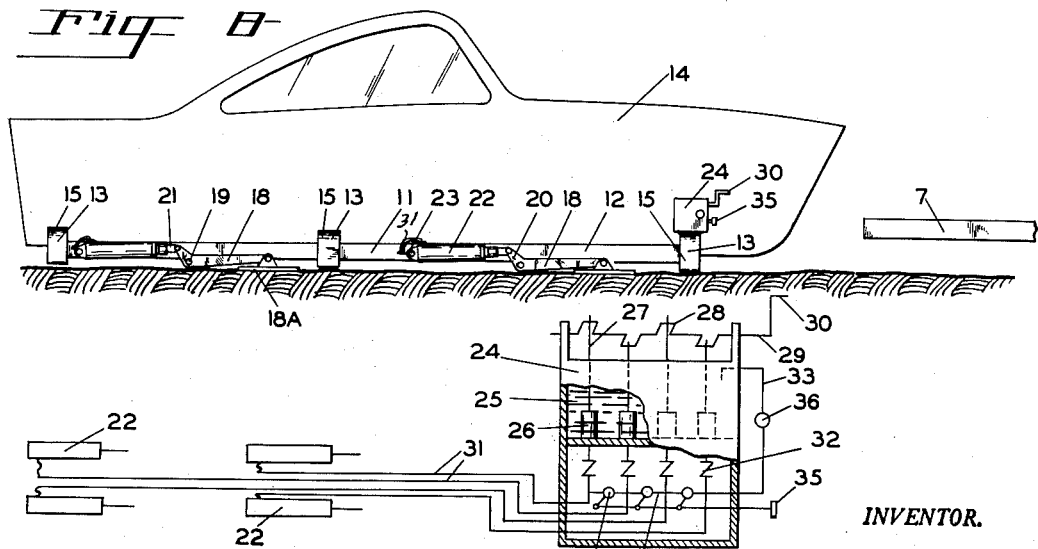
INVENTOR.
OREN P. BURCH

2,750,058
BOAT TRAILER

Oren P. Burch, Eugene, Oreg.

Application May 20, 1954, Serial No. 431,244

2 Claims. (Cl. 214—515)

This invention relates to improvements in boat trailers and is particularly concerned with trailers for small or medium size boats by which they may travel over the highway and by which they may be launched in the water.

It is among the primary objects of the present invention to provide a new and improved boat trailer having self contained means for raising and lowering a boat so as to facilitate transfer from and to the water.

A further object of the invention is to provide a combined but separable boat cradle or subframe and wheeled carriage or trailer so that the boat may be floated to and from the subframe before or after the trailer and subframe are united.

Another object is to provide novel and improved hydraulic power means for raising a boat subframe to facilitate application and removal of a wheeled trailer.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Figure 1 is a plan view of one preferred form of the present invention;

Figure 2 is a rear view of the device showing the boat mounted thereon and taken on line 2—2 of Figure 7;

Figure 3 is a detail view taken on line 3—3 of Figure 1 showing the bunks mounted on the trailer frame;

Figure 4 is a detail view taken on line 4—4 of Figure 2;

Figure 5 is an enlarged sectional view, taken on line 5—5 of Figure 1;

Figure 6 is a side elevation of the hydraulic lifting apparatus taken on line 6—6 of Figure 1;

Figure 7 is a side view, showing the subframe having been lifted from the trailer frame;

Figure 8 is a view similar to Figure 7 showing the trailer removed from the subframe, and Figure 9 is a diagrammatical view of the hydraulic system for raising and lowering the subframe and the boat.

In that form of the present invention here presented, the trailer comprises a frame 1 mounted upon the usual wheels 2, the frame 1 including two parallel beams 3 coming together at 4 at their forward ends and terminating in a trailer hitch 5. These beams 3 are spaced apart by the cross member 6 at their forward ends and by a cross member 7 bridging their rear ends 8. The member 7 is hingedly mounted to one of the beams 3 by vertical pins 9 and is adapted to be releasably secured at its opposite end to the parallel beam 3 by pin 10. Member 7 may thus be swung outwardly to the dotted line position of Figure 1 while disconnecting the trailer.

The subframe 11 comprises a central channel 12 and transverse bunks 13 formed integral therewith. Bunks 13 are adapted to support the hull 14 of the boat being transported by the trailer, the outer ends 15 of the bunks rest on the beams 3 as best illustrated in Figures 1, 2 and 3 during transportation. Ends 15 have downwardly extending fingers 16 adapted to fit over the top and sides of the beams 3.

Channel member 12 is strengthened by flat bars 17, welded, as illustrated in Figure 5, within the channel giving rigidity to the subframe 11.

When loading or unloading the boat from the trailer frame 1 the subframe 11 is raised so that the fingers 16 of the bunks 13 will clear the beams 3 of the trailer frame, as best illustrated in Figures 2 and 7. Power means for such lifting of the subframe and boat is provided by four legs 18 pivotally mounted to the inverted channel 12 by way of transverse shafts 19, welded or otherwise secured to the said channel. Each leg 18 has a crank 20 forming part thereof and each crank is connected to a piston rod 21 of an hydraulic cylinder 22. The said hydraulic cylinder 22 is pivotally connected to the channel member 12 at 23. When the piston rod 21 of the cylinder 22 is forced out of the cylinder it will bring the legs 18 to the position shown in Figure 7, raising the subframe 11 from the frame 1 of the trailer. In order to operate the hydraulic cylinders 22, there is provided an hydraulic pump 24 mounted to the forward bunk 13, as best illustrated in Figures 1, 7 and 8.

In order to properly raise and lower the subframe 11 all of the feet 18A of the legs 18 should come to rest on the supporting surface before exerting any lift. In Figure 9 I have tried to illustrate by diagrammatical means how this can be accomplished. An oil reservoir 25 is provided, having cylinder and piston units 26 located therein. The pistons of units 26 have connecting rods 27 which are operated by the cranks 28 of a transverse shaft 29, the said shaft 29 being rotated by either a hand crank 30 or by a power mechanism. Each unit 26 delivers fluid through the separate pipes 31 to a separate cylinder 22, check valves 32 being provided to prevent fluid from returning to the pumping cylinders 26. The pipes 31 are interconnected by the piping 33 through shut off valves 34 controlled by a push and pull rod 35. The pipe 33 returns to the reservoir 25 through a shut off valve 36.

In the operation of the present device, when it is desired to unload the boat, the push and pull rod 35 is positioned so as to open the valves 34, valve 36 being closed. The shaft 29 is then revolved so that cranks 28 operating the connecting rods 27 pump the hydraulic fluid from each of the pumping cylinders 26 into the pipe lines 31. As each of the legs 18 and the feet 18A contact the supporting surface the hydraulic fluid will transfer through the piping 33 and the valves 34 until all of the feet have contacted the said supporting surface. At this time the push and pull rod 35 will be operated to close the valves 34 causing the pumping cylinders 26 to force the fluid through each of the individual lines 31, directly to the corresponding hydraulic cylinders 22 raising the subframe 11 and the boat 14 sufficiently high, as illustrated in Figure 7, so that the fingers 16 of the bunks will clear the beams 3 of the trailer frame 1. Check valves 32 will hold the fluid within the hydraulic cylinders 22 at all times so that when the pumping of the cylinders 26 ceases the pistons within the cylinders 22 will remain in a fixed position. With cross member 7 of the trailer frame 1 opened, the trailer 1 may be pulled forward from under the subframe 11 and the bunks 13.

In order to lower the subframe and the boat the push and pull rod 35 is moved to open the valves 34, allowing the hydraulic fluid from the cylinders 22 to escape through the lines 31, valves 34, through the pipe 33, valve 36 and into the liquid tank 25, thus the legs 18 may assume the position shown in Figure 8.

Although a certain specific embodiment of the invention has been shown and described, it is obvious that many modifications thereof are possible. The invention, therefore, is not to be restricted except in so far as is necessitated by the prior art and by the spirit of the appended claims.

What I claim is:

1. A boat trailer comprising a boat supporting subframe, a wheeled trailer removably supporting said subframe and power means contained within said subframe for lifting the subframe from the trailer, said power means including pivotally mounted legs, a plurality of cylinder and piston units, a plurality of lifting members, fluid interconnection between said units and lifting members operable at the beginning of the lifting movement and means for terminating said interconnection as said lifting members become effective.

2. The trailer as set forth in claim 1 and manually controlled valve means to maintain or release pressure from the lifting members.

References Cited in the file of this patent

UNITED STATES PATENTS

| | | |
|---|---|---|
| 493,980 | Coler | Mar. 21, 1893 |
| 1,303,854 | Clark | May 20, 1919 |
| 2,129,340 | Webber | Sept. 6, 1938 |
| 2,172,244 | Grundler | Sept. 5, 1939 |
| 2,389,338 | Zorc, Jr. | Nov. 20, 1945 |
| 2,485,793 | Vassar | Oct. 25, 1949 |
| 2,636,745 | Cartwright | Apr. 28, 1953 |